United States Patent Office 3,228,963
Patented Jan. 11, 1966

3,228,963
PROCESS FOR PURIFICATION OF
COMPLEX ACIDS
Louis A. Joo, Crystal Lake, and Walter E. Kramer, Miles, Ill., assignors, by mesne assignments, to Union Oil Company of California, Los Angeles, Calif., a corporation of California
No Drawing. Filed Dec. 22, 1961, Ser. No. 161,355
3 Claims. (Cl. 260—327)

This invention relates to a method of fractionating complex acid mixtures and to the products so obtained. More particularly, this invention relates to a method of treating complex, high-molecular-weight carboxylic acids, such as those derived from solvent extracts obtained in the solvent extraction of mineral lubricating oil fractions. The complex acids may be from other sources, hereinafter defined, but the invention has particular application to the complex acid mixtures prepared from solvent extracts by metalation and carbonation, or metalation, carbonation and acidification, as described in copending applications Serial No. 819,932, filed June 12, 1959 by T. W. Martinek, and now abandoned and Serial No. 79,661, filed December 30, 1960 by W. E. Kramer, L. A. Joo and R. M. Haines, now U.S. Patent 3,153,087. In addition, the invention is applicable to the separation of the acid mixtures formed by the nitrogen dioxide oxidation of solvent extracts described in copending applications Serial No. 114,637, filed June 5, 1961; Serial No. 114,677, filed June 5, 1961, now U.S. Patent 3,135,767 and Serial No. 24,883, filed April 27, 1960, and now abandoned and the halogenated aromatic acids described in copending applications Serial No. 50,334, filed August 18, 1960, by Joo et al., now U.S. Patent 3,056,773 and Serial No. 155,835, filed November 29, 1961.

It is known in the art, e.g., Schmidl, U.S. 2,523,154, that petroleum phenols and sulfur compounds, released by the neutralization of solutions obtained when hydrocarbon oils are treated with aqueous alkali, can be freed of undesirable sulfur compounds (mercaptans) by the use of weak acid solutions in the oils in a first step, followed by bringing the pH to about 9 to separate an aqueous phase and an oil phase. Bosing, in U.S. Patent 2,154,372, shows the fractionation of mineral oils by treatment with pyridine and an aqueous alkali solution, simultaneously, to separate three phases: an extract, a raffinate, and an aqueous alkali phase, and further contacting the raffinate with additional solvent and alkali solution. The successive treatment of various acidic mixtures with carbon dioxide at different pressures is taught as a means of separating acids by Pilat in U.S. 2,188,013. The art does not disclose a method of fractionating complex acid mixtures into a series of fractions of differing molecular weights and differing acid numbers particularly as applied to the complex acids derived from solvent extracts as defined herein. The materials separated may be present as salts in the oil solution after carbonation, or they may be present as free acids after carbonation and acidification, in which case, they are converted to salts prior to treatment in accordance with this invention.

The process of this invention consists essentially of (1) dissolving the salts of the acids to be fractionated in a first solvent in which the free acids are at most only sparingly soluble; (2) adding a small amount of an acid sufficiently strong to decompose the salts and liberate a portion of the desired acids; (3) extracting the liberated acids from the resulting mixture using a second solvent which is immiscible with said first solvent; (4) adding another small amount of mineral acid to the remaining salt solution; (5) again extracting the acids thus liberated with said second solvent; and (6) continuing this cyclic acidification and extraction until the first solvent is substantially free of the desired acids and their salts.

The method of this invention utilizes fractional neutralization or acidification to separate complex acid mixtures where less complex systems or methods, such as distillation, crystallization, extraction, etc., are ineffective.

Accordingly, it becomes a primary object of this invention to provide a process for separating complex acid mixtures into fractions of varying molecular weight and varying acid number.

Another object of this invention is to provide fractions of complex acids of different molecular weights and different acid numbers.

An object of this invention is to provide a process of separating complex, high-molecular-weight, carboxylic acids by stepwise acidification and extraction of the salt solutions.

An object of this invention is to provide a process of separating mixtures of complex, high-molecular-weight, carboxylic acids by cyclic acidification, extraction, and separation of phases until the original mixture is substantially free of the desired acids and their salts.

These and other objects of this invention will be described or become apparent as the specification proceeds.

In order to demonstrate the invention, the following examples are given:

EXAMPLE I

A water solution containing 26 g. of the sodium salts of "extract acids" per 100 ml. was prepared, a 150-ml. portion of it was treated with 1 ml. of hydrochloric acid, and the resulting liberated acid was extracted with 20 ml. of toluene (Fraction 1, Table I). Then the acidification with hydrochloric acid and the extraction were repeated in cyclic fashion, until no more acid was obtained from the water phase. After the "extract acid" had reached an acid number of 220 (Fraction 6, Table I), the extraction solvent was changed to ether, since the higher-acid-number acids are insoluble in toluene. The results of the procedure are given in Table I.

Table I

Original "Extract Acid":
A.N. ---------------------------------------------------------- 218
Mol. wt. ------------------------------------------------------ 420
Percent Unsaponifiable ---------------------------------------- 8.7
—COOH/mol ----------------------------------------------------- 1.66

| Fraction No. | Amount (g.) | Acid No. | Mol. wt. | —COOH/mol |
|---|---|---|---|---|
| 1 | 4.84 | 77 | 424 | 0.60 |
| 2 | 5.53 | 119 | | |
| 3 | 4.81 | 122 | 400 | 0.80 |
| 4 | 4.59 | 107 | | |
| 5 | 5.46 | 163 | 400 | 1.40 |
| 6 | 2.08 | 217 | | |
| 7 | 1.62 | 298 | 400 | 2.10 |
| 8 | 0.70 | 282 | | |
| 9 | 1.33 | 342 | 390 | 2.20 |
| 10 | 1.52 | 344 | | |
| 11 | 2.18 | 389 | 385 | 2.80 |
| 12 | 0.28 | 403 | | |

EXAMPLE II

In this example, the same stock solution was used as in Example I, but ether was used as the extraction solvent from the beginning. First, a 150-ml. portion of the "extract acid" salt solution was extracted with 20 ml. of ether. Then 1 ml. of concentrated hydrochloric acid and 10 ml. of water were added to the ether solution, and the resulting acidic water phase was separated from the ether phase, containing "free extract acid," and combined with the raffinate phase from the previous ether extraction step. After the water phases had been combined, they were extracted again with ether, the ether solution was acidified with 1 ml. of concentrated hydrochloric acid and 10 ml. of water, and the water phase was again separated from the ether phase, again containing "extract acid," and combined with the stock solution. This procedure was repeated until no more acid was obtained from the extract-acid-salt water solution when the solution was acidified.

The ether phases were washed twice with 10-ml. portions of water, and then the ether was evaporated to leave the acid fractions as products. These acid fractions had higher acid numbers than the fractions obtained by the method used in Example I, indicating that some acid salt had been extracted along with the acids in Example I. The results of this method are given in Table II.

*Table II*

Original "Extract Acid":
A.N. --- 218
Mol. wt. --- 420
Percent Unsaponifiable --- 8.7
—COOH/mol. --- 1.66

| Fraction No. | Amount (g.) | Acid No. | Mol. wt. | —COOH/mol |
|---|---|---|---|---|
| 1 | 0.99 | 39 | 475 | 0.33 |
| 2 | 2.72 | 104 | | |
| 3 | 3.72 | 128 | 405 | 0.92 |
| 4 | 3.96 | 143 | | |
| 5 | 3.66 | 152 | 400 | 1.10 |
| 6 | 3.07 | 157 | | |
| 7 | 3.07 | 161 | | |
| 8 | 2.81 | 175 | 400 | 1.25 |
| 9 | 2.62 | 167 | | |
| 10 | 3.09 | 195 | 440 | 1.50 |
| 11 | 2.37 | 191 | | |
| 12 | 2.89 | 247 | 415 | 1.83 |
| 13 | 2.46 | 271 | | |
| 14 | 2.47 | 285 | | |
| 15 | 2.20 | 325 | 400 | 2.30 |
| 16 | 2.12 | 408 | 430 | 3.13 |
| 17 | 0.45 | 406 | | |

The process of this invention is applicable to many different, complex, high-molecular-weight, carboxylic acid mixtures such as those obtained by the oxidation of complex alcohol and aldehyde mixtures using potassium permanganate and sulfuric acid; complex, aromatic and heterocyclic acid salts produced by the metalation of solvent extracts followed by carbonation, or conversion of the salts so produced to acids by acidification, and reconversion to salts by neutralization. The latter will be used to demonstrate this invention, because they are particularly difficult to handle and purify due to the complex nature of the source material, that is, the presence of condensed rings and heterocyclic substituents in the molecules, the random placement of the carboxyl groups thereon, and the presence of side chains.

The complex carboxylic acids to be treated in accordance with this invention are in the form of salts and are represented by the formula, $$R(COOM)_n$$

where R is a complex, aromatic, alkylaromatic or heterocyclic nucleus, M is a metal alkali or ammonium cation and $n$ has a value of 1 to 4, or,

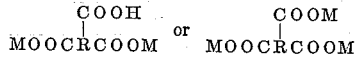

i.e., a complete or partial salt of a tribasic acid with an alkali metal or ammonium cation, where R and M are as defined above.

R in the foregoing formulae may be any complex organic ring system or combination of organic ring systems such as cyclopentane, furan, thiofuran, benzene, substituted benzene, 1,2-pyran, 1-4-pyran, indene, isoindene, benzofuran, isobenzofuran, benzisoxazole, naphthalene, substituted naphthalene, acenaphthene, fluorene, anthracene, phenanthrene, xanthene, thianthrene, naphthacene, chrysene, pyrene, and triphenylene.

As a preferred embodiment of this invention, and illustrative of the complex R group in the foregoing acid formulae, are acids derived from solvent extracts or other sources of complex aromatic nuclei by metalation and carbonation.

The starting material for the reaction may be any complex, aromatic and/or heterocyclic mixture or compound from synthetic or natural sources. A preferred and unique source of aromatic starting material comprises petroleum fractions rich in complex polynuclear aromatic hydrocarbons, not only because the acid products therefrom are difficult to purify and separate by ordinary means but also, because the techniques outlined herein are particularly adapted to processing these more complex and resistant source materials. Illustrating the preferred and novel starting materials as a source of the R group is the class of materials known as solvent extracts from the manufacture of mineral lubricating oils. These solvent extracts are rich in complex, polynuclear, aryl, alkaryl, condensed-ring and heterocyclic nuclei forming the organic portion of the carboxylic acids to be treated in accordance with this invention. Solvent extracts from the manufacture of bright stock and neutral lubricating oils are particular examples of such fractions rich in complex aromatic compounds, obtained as by-products from the solvent refining of mineral oils.

These extracts, hereinafter referred to as solvent extracts, are obtained as the extract or solvent phase when lubricating oils are refined by treatment with a selective solvent having an affinity for aromatic and sulfur compounds. The complex hydrocarbons removed by this refining treatment contain appreciable amounts of combined sulfur, nitrogen and oxygen as part of the molecules. These complex hydrocarbons contain a predominance of polynuclear rings of aromatic structure, and of condensed configurations having or containing hydrocarbon substituent groups attached thereto as side chains. These starting materials are of a generally viscous nature, have low viscosity indices, low resistance to oxidation, and are considered to be deleterious in lubricating oils. Heretofore, these aromatic extracts have been regarded as waste products, and because they are exceedingly complicated mixtures of complex compounds, including various sulfur-, oxygen-, and nitrogen-containing compounds, they have not been used successfully in preparing petrochemicals or as sources of hydrocarbon reactants or starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS at 210° F. of 165–175, NPA color 6–7, flash 575° F., fire 650° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as bleeding stock, for lubricating oils, and the solvent extract, predominating in complex aromatic constituents, is distinctively useful in accordance with this invention.

For example, a crude oil from an East Texas field, with an API gravity of 33.1, was topped to remove such light fractions as gasoline, naphtha, kerosine, and a light lubricating distillate. The vacuum residue was a reduced crude, having a viscosity of 1251 SUS at 210° F., 2.2 percent sulfur, and an API gravity of 12.6. After propane-deasphalting, the oil had a viscosity of 174 SUS at 210° F., and an API gravity of 21.7. This deasphalted oil was treated with phenol to produce a raffinate from which an aviation lubricating oil could be prepared. The oil extracted by phenol treatment, after removal of phenol, is ready for use as the starting material to prepare the acids or salts.

Solvents other than phenol may be used to obtain the extraction product used in preparing acids suitable for treatment in accordance with this invention. For example, liquid sulfur dioxide, nitrobenzene, Chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the chemical and physical characteristics of typical extract products, from lubricating oil stocks derived from various crude oils and other source hydrocarbon materials, which Table IV

| Characteristic: | Range of value |
|---|---|
| Gravity, ° API | 7.3–18.3. |
| Gravity, Sp., 60/60° F. | 0.9446–1.0195. |
| Viscosity SUS at 210° F. | 40–1500. |
| Viscosity index | minus 153–plus 39. |
| Pour point, ° F. | 20–115. |
| Color, NPA | +2–5D. |
| Molecular weight, average | Above 300 to 750. |
| Sulfur, percent wt. | Above 0.6. |
| Nitrogen, percent wt. | Below 1. |
| Aromatic compounds, percent (including heterocyclics) | 75–98. |
| Av. No. of rings/mean arom. mol. | 1.7–3.5. |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100±5 VI neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocyclic compounds in the range of 75–98%, the remainder being principally saturates, or material behaving as saturates, together with a minor proportion of up to about 7% of organic acids.

Table III.—Sources and Physical characteristics of solvent extracts

| Ext. No. | Crude Source | Solvent | API Grav. | Sp. gr. at 10° F. | Vis/100° F. | Vis/130° F. | Vis/210° F. | V.I | ° F. Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex. | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.88 |
| 9 | Santa Fe Springs. | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | do | Nitrobenzene. | 10.0 | 1.000 | | | 1,500 | | +75 | 555 | 640 | 60 | | |
| 13 | Mid-Cont. | Propane-cresol. | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex. | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 vis. neutral, had an average molecular weight of 300, and contained 76.8% aromatics (by the silica gel procedure).

Extract No. 42 was obtained in the production of 150 vis. Bright Stock, had an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 vis. neutral, had an average molecular weight of 340, contained 87.0% aromatics, 13% saturates, 86.4% carbon, 10.7% hydrogen and averaged 2.7 aromatic rings per aromatic molecule.

Extract No. 44 was obtained in the production of 200 vis. neutral, had an average molecular weight of 340, and contained 87% aromatics, and 13% saturates.

Extract No. 45 was obtained in the production of 160 vis. Bright Stock, and contained 92% aromatics and 8% saturates.

may be used to prepare acids and salts to be separated in accordance with this invention.

The solvent extracts from lubricating oils used as starting materials in preparing acid mixtures suitable for fractionation in accordance with this invention have the following general properties and characteristics:

The organic acids present are not susceptible to extraction by the use of aqueous strong caustic because of the solubility of the alkali metal salts of the acids in the oil. Little or no asphaltic material is present in solvent extracts and they contain essentially no materials volatile at room temperature.

The complexity of the types of compounds present which become the R groups of the polybasic acids, as based on these analyses, is illustrated by the following table:

*Table V.—Estimated chemical composition of solvent Extracts Nos. 19, 21, 43 and 44 of Table III*

| Type of Compound: | Approx. percent in the extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 00.5 |
|   Substituted benzphenanthrenes | 0.2 |
|   Substituted pyrenes | 0.2 |
| Pentanuclear aromatics: | |
|   Perylene | 0.01 |
| Sulfur compounds,[1] oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction to form complex acid mixtures. For example, solvent extracts may be distilled, and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material.

In addition to the general physical and chemical properties of the solvent extracts given in Table IV, these starting materials may be further characterized by the fact that their average molecular weight is about 320 to 600, the boiling point (initial) is between 300 to 1000° F., the end boiling point is between 400 to 1200° F., and they may exhibit pour points as high as 100° F. Chemically, the extracts may contain 2.0 to 4.5% wt. of sulfur, exhibit a H/C wt. ratio of 0.116 to 0.136, a H/C atom ratio of 1.383 to 1.622, a H/C atom ratio, based only on the aromatic portion, of 1.289 to 1.500, and the nearest empirical formula is $C_{22}H_{30}$ to $C_{44}H_{66}$. The extracts may contain from about 15% to 50% by weight of sulfur compounds and 30% to 90% by weight of aromatic and thio-compounds, combined. Many of these characteristics, particularly the chemical characteristics, carry over into the polynuclear polybasic acids to be separated in accordance with this invention.

Without limiting the invention, the characteristics of the acid products or mixtures to be separated as an illustration of this invention are further disclosed as thus far evaluated. The novel carboxylic acids of this invention are mixtures of acids of the dihydronaphthalene, dihydrophenanthrene, and dihydroanthracene types averaging in molecular weight from about 375 to 450, and having several alkyl groups on each aromatic nucleus, wherein the sum of the carbon atoms in the alkyl substituents varies between 15 to 22. Despite the size of the acid molecules, the linkages through or between the carboxyl groups are about the same as those of phthalic and terephthalic acids. A portion of the aromatic rings or condensed aromatic rings is probably further condensed with naphthenic rings to form configurations similar to the steroid ring systems. Extract acids from solvent extracts obtained in the production of bright stocks probably contain more highly condensed aromatic structures. Most of the sulfur (1.9 to 4.5% total sulfur being present) is in the form of heterocyclic rings with carbon, associated with both the aromatic-type and naphthenic-type structures present. Only a trace amount of the sulfur is present as high-molecular-weight aliphatic sulfides.

The nitrogen content of distilled solvent extracts is 0.91 to 0.04%. Analysis for the types of carbon linkages as percent $C_a$ (carbon atoms in aromatic configuration), percent $C_n$ (carbon atoms in naphthenic configuration), and percent $C_p$ (carbon atoms in paraffinic configuration) gives results ranging from about 30–40% $C_a$, 20–35% $C_n$ and 31–47% $C_p$, using the method of Kurty, King, Stout, Partikian and Skrabek (Anal. Chem. 28, 1928 (1956)). The extract acids have acid numbers (1948 Method) of from 200–300, M.P. 80–90° C., Br. No. 16–24, sulfur 1.7–2.3%, are deep red in color and transparent in thin sheets, and contain 2–6% unsaponifiables. They are soluble in ethyl ether, acetone, MEK, tetrahydrofuran, benzene, toluene and xylene. The acids are useful in preparing various resins including alkyd, polyester, polyamide and epoxy resins, and also have utility as corrosion inhibitors.

Although the invention has been demonstrated by a number of examples, these are not to be construed as limiting. The term "solvent extracts" is used in its recognized meaning in the solvent extraction art. The term "extract acids" or "extract polycarboxylic acids" used herein shall be construed to include acids containing 1 or more carboxyl groups per molecule with the upper limit being as high as 4 carboxyl groups.

The acids are more accurately described as dihydrocarboxylic acids, since there is a change in structure with the introduction of the carboxyl groups. A very simplified structure, without showing the numerous alkyl substituents or the heterocyclic nuclei, and the relative percentage of each structure, may be:

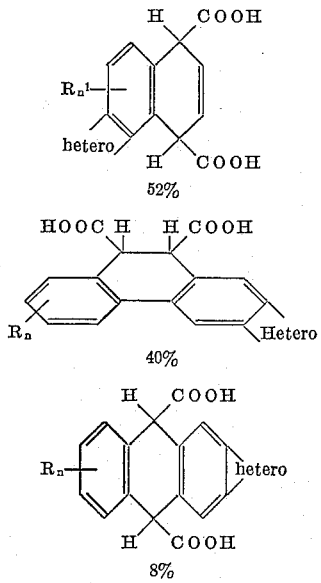

where $R^1$ comprises alkyl substituents having a sum of about 15 to 22 carbon atoms in each formula, $n$ is the number of such alkyl groups and may be from 3 to 10, and "hetero" illustrates one or more S—, N—, or O- containing heterocyclic rings in the molecule. The molecular weight of the acids ranges from 300 to 600, and averages from 325–450. R can be one or more cycloalkyl radicals or mixed alkyl and cycloalkyl radicals.

The formulae supra are merely illustrative of the dibasic acid fraction, and the acid fractions produced by the process of this invention can be predominantly monobasic, predominantly dibasic, or predominantly tribasic with the residual fractions having as many as four carboxyl groups per molecule. The relative proportion of each type of acid present in the various fractions depends somewhat on the processing conditions applied in the original acid preparation as is known in the art. Since the acids produced by metalation contain one more carbon atom per carboxyl group due to the carbonation reaction, their structures and also the position of the carboxyl group on the molecule will vary from the acids prepared by other methods, from other starting materials. Thus the acids produced by the method of application Serial No. 24,883 will have their carboxyl groups positioned in relation to the alkyl radical oxidized by the nitrogen dioxide. Similarly, the acids separated when using the mixed acids produced by halogenation according to the process of application Serial No. 50,334 will contain halogen substitutes in addition to carboxyl groups resulting from metalation, carbonation and acidification. These distinctions are apparent to one skilled in the art and need no further explanation.

The following Table VI gives the physical properties of typical extract acids:

*Table VI.—Physical properties of extract acids*

| Property: | Value |
|---|---|
| Acid Number | 200–280. |
| Melting points | 80–90° C. |
| Bromine No. | 16–24. |
| Percent sulfur | 1.7–2.3. |
| Color | Deep red. |
| Percent unsaponifiables | 2–6. |

In order to further illustrate the complexity and types of acids that can be treated in accordance with this invention the following tabulation is given of the physical and chemical properties of acids prepared from solvent extracts from mineral lubricating oils. These acids are essentially mixtures of mono-, di-, and polycarboxylic acids having an R group as heretofore illustrated, some of which are prepared by metalation, carbonation and acidification, others prepared by halogenation of the foregoing acid mixture, and still others prepared by nitrogen-dioxide oxidation.

*Table VII.—Typical properties of a number of example complex acids*

A. MIXED ACIDS PREPARED FROM SOLVENT EXTRACTS

| No. | Sap. value | Mol. wt. | Percent S | Br No. | Percent unsap. | Eq. wt. | Eqs./mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |

B.

| 8a | | 770 | | | | | | 29 |
| 8b | | 670 | | | | | 1.9 | 151 |
| 8c | | 670 | | | | | | 150 |
| 8d | | 680 | | | | | | 160 |
| 8e | | | | | | | | 45 |

The species of acids bearing sample numbers 8 to 8e inclusive are described in detail in four related copending applications. Acid Sample No. 8 was prepared by reaction of 63% by wt. of $NO_2$ with solvent extract at 140° C. in accordance with application Ser. No. 24,883. Sample No. 8 contained 2.4% nitrogen as a result of $NO_2$ oxidation. Acid Sample Nos. 8a, 8b, 8c and 8d were prepared in accordance with the $NO_2$ oxidation process of application Ser. No. 114,637. Acid Sample No. 8c was prepared by the method of Example I of application Ser. No. 114,677. Sample No. 1 contains 2.1 carboxyl groups/molecule and No. 3 contains more than 2.0 carboxyl groups/molecule.

The halo-acids prepared in accordance with copending application Serial No. 155,835 as described in Examples I, II, III, and IV represent additional species of high-molecular-weight acids, containing 1 to 5 halogen atoms, that may be treated in accordance with this invention. In addition, the polyhalo acids described in copending application Serial No. 50,334, such as those set forth in Examples I, II, III, and IV therein, may be separated by the process of this invention. Also, the acids prepared by the methods of Examples II, III, IV, V, VI and VII of application Serial No. 114,677 may be purified and fractionated in accordance with this invention.

The complex acids are in salt form for the application of the process of the invention. For this purpose, the preferred forming agent may be used, e.g., alkali metal hydroxides or ammonia and amines to form a salt that is soluble in the first solvent. Thus methylamine, benzylamine, ammonium, sodium, potassium, rubidium and cesium salts are illustrative. The acids, if in the free or partial salt form, are first reacted with an appropriate alkali metal hydroxide or amine to form the salt or mixed salt. Sodium hydroxide, potassium hydroxide, ammonium hydroxide, and the like are preferred for economic reasons.

The acid used to liberate the free complex organic carboxylic acids may be a mineral acid such as hydrochloric acid, sulfuric acid, or phosphoric acid. Strong acids are preferably used in diluted form, e.g., 20% to 50% by volume of acid in aqueous solution.

The solvent used in the cyclic extractions is preferably a solvent in which the free acids are highly soluble, e.g., toluene, benzene, the xylenes, methylbenzene, propylbenzene, chlorobenzene, ether, etc.

The high-molceular-weight complex organic acids to be treated in accordance with invention are not soluble in water or the first solvent with which the mineral acid is miscible or soluble. The cheapest and most effective first solvent is water and the second, or organic, solvent used can be any solvent which is not miscible with water. Thus the second solvent can be any water-insoluble organic solvent or oxygenated organic compound which is essentially inert and does not form stable emulsions that are difficult to break. In carrying out the method of this invention, the second solvent can be present during the acidification with mineral acid and the desired fraction or fractions separated by decantation, or the second solvent can be added after the acidification using known methods of liquid-phase extraction. The process is carried out using known manipulative techniques of extraction, including solvent ratios, temperatures, etc., and need not be further described except to state that the solvent/acid ratios may vary from 1:1 to 30:1 and the temperature is ambient.

At each cyclic neutralization by addition of mineral acid to the salt solution, between about 1% to 30% of the acids can be liberated, depending on the degree of separation, or purity, or number of fractions desired. Preferably, each neutralization frees about ⅕ to ½₀ of the acids so that a minimum of about 5 to a maximum of about 20 fractions are obtained. The fractionation can be adjusted so that the molecular-weight differential is about 5 to 75 units; the acid numbers of the fractions may differ by about 40 to 450 or more. In general, as shown by the results obtained herein, the separation is in accordance with the number of carboxyl groups per mole, this value ranging from less than 1.0 to as high as 3.0 or more. Another basis for following and controlling the separation is in accordance with the acid number.

The complex acid mixtures to be separated or fractionated in accordance with this invention may originate from the application of several known methods of acid manufacture using starting materials other than solvent extracts, as described herein by way of illustration. However, the application of the instant method to the complex acids prepared from solvent extracts represents a feature of this invention because these starting materials and the acid products therefrom not only represent a unique source of complex nuclei but are utilizable in the preparation of resins, polyesters, polyamides, cross-linked polymers, and monomeric derivatives having many desirable and new properties. The source of complex nuclei may also be the FCC cycle stock or reformer bottoms described, which materials contain related complex aromatic and condensed ring compounds amenable to the carboxylation reaction. Thus the acids may be prepared by:

(1) Transformation of a side chain to a carboxyl group by oxidation.

(2) Replacement of a halogen group by a cyano group followed by acid hydrolysis.

(3) Replacement of an amino group by a cyano group i.e. diazotization of a primary amine, followed by the Sandmeyer reaction, followed by acid hydrolysis.

Such processes are applied in the preparation of many different aromatic acids to include phthalic acid, isophthalic acid, terephthalic acid, hemimellitic acid, trimellitic acid, trimesic acid, prehnitic acid, mellophanic acid, pyromellitic acid, mellitic acid and diphenic acid; and aryl-substituted paraffinic acids (acids having a phenyl group or other aromatic group at the terminal position of an aliphatic chain) such as phenylacetic acid, hydrocinnamic acid, γ-phenylbutyric acid, δ-phenyl-n-valeric acid, ε-phenyl-n-caproic acid, cinnamic acid, phenylpropiolic acid, homophthalic acid, o-phenylenediacetic acid, m-phenylenediacetic acid, o-phenyleneacetic-β-propionic acid and the like. It is to be understood that the acid mixtures to be treated in accordance with this invention may contain mixtures of two or more of the foregoing acids or homologs thereof, prepared by any method wherein the aromatic portion thereof is simple and/or complex. The invention has particular application where the acids are complex in nature and cannot be fractionated by distillation and related methods. The method is also applicable to halo-, hydroxy-, and nitro-, derivatives of complex aromatic acids.

Accordingly, the method of this invention encompasses the separation of mixtures of carboxylic acids of aromatic character by converting the acids to salts, dissolving the salts in a solvent having a low solubility for the free acids, liberating at least a portion of said free acids, and extracting said liberated portion from the mixture. A feature of the invention is the application of this method to the mixture of acids derived from solvent extracts obtained in the solvent refining of mineral lubricating oils by treatment with a solvent selective for aromatic compounds, and metalation, carbonation, and acidification of the solvent extracts. The acids from this source are characterized by their complexity, mol. wt., polynuclear alkaryl and heterocyclic configurations, and the number of rings per mean aromatic molecule. Since in the process of carbonation of the adduct of the alkali metal there is formed the corresponding salt, the method encompasses treating this salt mixture directly, whether separated from the unreacted oil phase or not, and whether or not further water-washed or purified. Another feature of the invention is the step of liberating successive portions of the acid and successively extracting each portion or combination of portions with a solvent selective therefor, or carrying out the liberation of the acids in successive portions in the presence of the second solvent, whereby separate phases are formed, one containing the second solvent and the desired acid fraction. The invention can be applied to the separation of mixtures of acids having different acidities and basicities.

The first fractions separated are generally the acids of low acid number, containing the fewest number of carboxyl groups, the intermediate fractions recovered are of intermediate acid number and contain an intermediate number of carboxyl groups, while the last fractions separated are of the highest acid number and contain the largest number of carboxyl groups. The various fractions of acids separated may be used as is, further purified, or combined with other fractions and used in resin preparations wherever acids having particular activities, molecular weights, and/or number of carboxyl groups are required. The copending applications incorporated by reference herein disclose other utilities for the products of this invention.

The embodiments of the invention in which an exclusive property or privilege is claimed are defined as follows:

1. The method of separating a mixture of mono-, di- and polycarboxylic acids into separate fractions predominating in monocarboxylic, dicarboxylic and polycarboxylic acids respectively, said acids differing in the number and position of said carboxyl groups and said mixture resulting from the treatment of solvent extracts, obtained in the solvent refining of mineral lubricating oils using a solvent selective for aromatic compounds, by reaction of said solvent extracts with an alkali metal to form the alkali metal adduct, carbonation of said adduct to form the alkali metal salt of said corresponding mixed acids and acidification of said salts to form the free acid mixture, said acids being characterized by being complex polynuclear aromatic and heterocyclic acids having average molecular weights of about 300 to 600, having about 1.9 to 4.5% combined sulfur in the form of heterocyclic rings and an average of about 1.7 to 3.5 aromatic rings per mean aromatic molecule which comprises (1) converting said acid mixture to a mixture neutralized salts by reaction with a base (2) dissolving said salts in a solvent having low solubility for said acids (3) adding a small amount of a mineral acid to convert a first portion of said salts to the free acid (4) extracting said first portion of free acids from said salt solution by contact with a second solvent in which said free acids are soluble and which is immiscible with said first solvent and recovering the free acids from the extract phase (5) adding another small amount of mineral acid to said salt solution to convert a second portion thereof to the free acid (6) extracting said second portion of free acids from said salt solution by contact with said second solvent and recovering the free acids from the extract phase (7) continuing the cyclic acidification and extraction with said second solvent until said first solvent is substantially free of said salts and (8) recovering separate fractions predominating in mono-, di-, and polycarboxylic acids from said extract phases.

2. The method in accordance with claim 1 in which the addition of said mineral acid to the neutralized salts is conducted in the presence of said second solvent.

3. The method of fractionating sodium salts of mixed carboxylic acids into fractions of different acid number, molecular weight and having a different number of carboxyl groups per molecule, said sodium salts being prepared by the reaction of solvent extracts, obtained in the solvent extraction of mineral lubricating oils using a solvent selective for aromatic compounds, with sodium to form the sodium adduct and carbonation of said adduct to form the sodium salts of the corresponding mixed carboxylic acids, which comprises (1) forming an aqueous solution of said sodium salts of said complex carboxylic acids (2) treating about 150 parts of said aqueous solution with about 20 parts of a solvent in which said salts are soluble and which is immiscible with water (3) separating a solvent extract from said aqueous solution
(4) treating said solvent extract with a mixture of about 1 part of mineral acid and about 10 parts of water
(5) separating a first aqueous raffinate and an acidic solvent extract
(6) combining said first aqueous raffinate with said aqueous solution from step (3)
(7) contacting said combined aqueous solution with about 20 parts of said solvent
(8) separating a second solvent extract from said aqueous solution
(9) treating said second solvent extract with a mixture of about 1 part of mineral acid and about 10 parts of water
(10) separating a second aqueous raffinate and a second acidic solvent extract
(11) combining said second aqueous raffinate with the aqueous solution from step (8)
(12) continuing sequentially said extraction, separation, acidification and combining steps until said aqueous solution is substantially free of said salts and recovering selected fractions of said complex acids of different acid number, molecular weight and having a different number of carboxyl groups per molecule from said solvent extracts.

References Cited by the Examiner

UNITED STATES PATENTS

| | | | |
|---|---|---|---|
| 1,770,393 | 7/1930 | Daniels | 260—525 |
| 1,945,246 | 1/1934 | Witzel | 260—525 |
| 2,231,898 | 2/1941 | Frankel | 260—705 |
| 2,336,364 | 12/1943 | Migrdichian | 260—525 |
| 2,471,053 | 5/1949 | Almquist et al. | 260—705 |
| 2,556,228 | 6/1951 | Sonders | 260—525 |
| 2,841,615 | 7/1958 | Schutt et al. | 260—525 |
| 2,846,468 | 8/1958 | York | 260—525 |

OTHER REFERENCES

McElvain: The Characterization of Organic Compounds (New York, 1958), pages 44–45, 50–52, and 60.

NICHOLAS S. RIZZO, *Primary Examiner.*

DUVAL T. McCUTCHEN, WALTER A. MODANCE,
*Examiners.*